Oct. 20, 1925.  1,557,856
O. H. LUEBBING
SEED PLANTER
Filed April 13, 1922  3 Sheets-Sheet 1

INVENTOR.
Oscar H. Luebbing
BY
ATTORNEYS

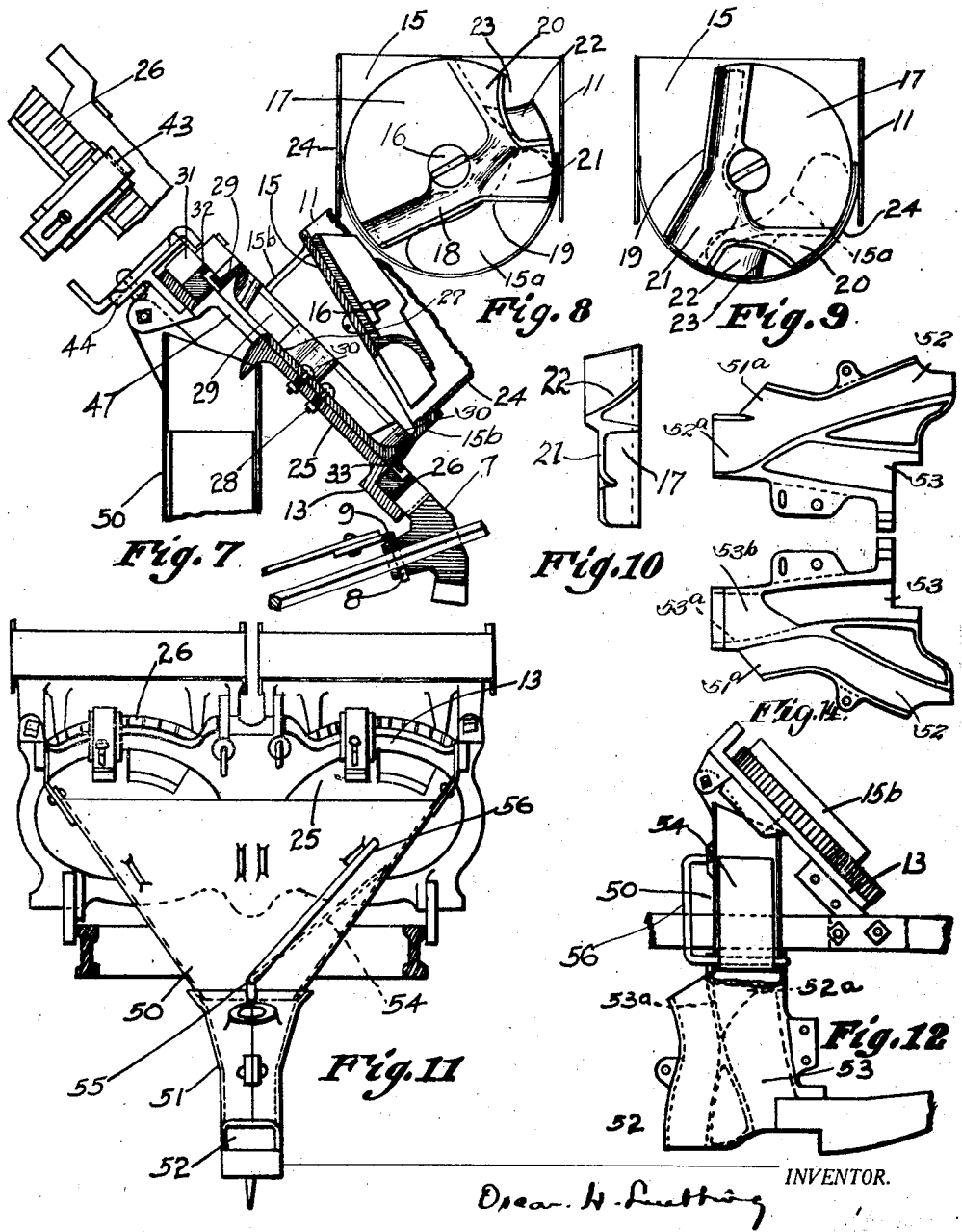

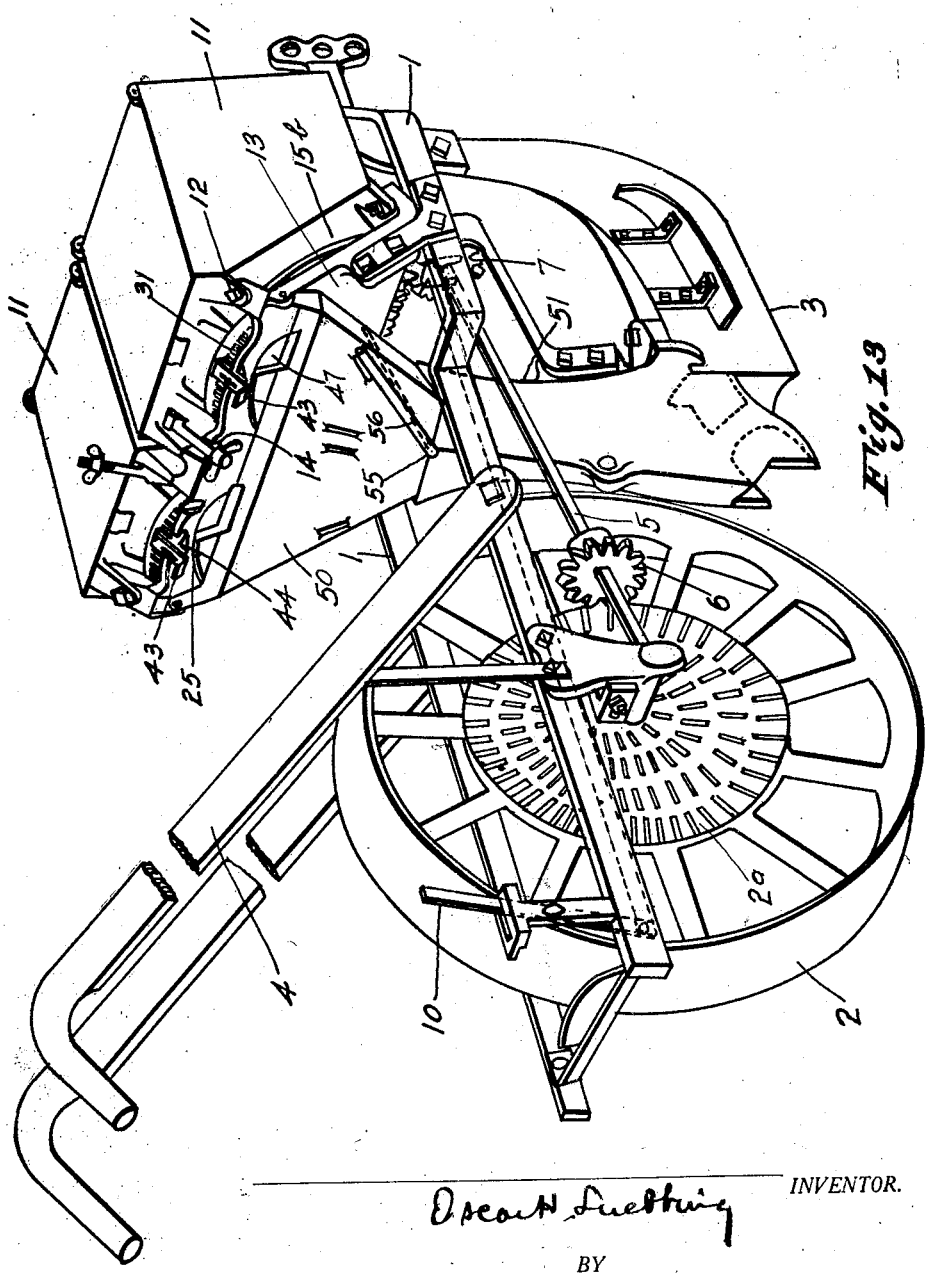

Patented Oct. 20, 1925.

1,557,856

UNITED STATES PATENT OFFICE.

OSCAR H. LUEBBING, OF HARRISON, OHIO, ASSIGNOR TO THE CAMPBELL-HAUSFELD COMPANY, OF HARRISON, OHIO, A CORPORATION OF OHIO.

SEED PLANTER.

Application filed April 13, 1922. Serial No. 552,124.

*To all whom it may concern:*

Be it known that I, OSCAR H. LUEBBING, a citizen of the United States, and a resident of Harrison, in the county of Hamilton and State of Ohio, have invented certain new and useful Improvements in Seed Planters, of which the following is a full, clear, and exact description, reference being had to the accompanying drawings, forming part of this specification.

My invention relates to planters for various kinds of seeds, particular attention being made to the planting of corn, beans and peanuts.

In an application for patent, Serial No. 302,684, filed June 9, 1919, by Frank E. Nichols, there is described a planter of somewhat similar design to that forming the basis of my present invention, the general object of my invention being the improvement in said Nichols machine.

Among other specific objects of my mechanism, is an arrangement for feeding seeds alternately from different hoppers, and for permitting either hopper or both to be stopped from feeding and started up again without loss of the same alternate timing.

I provide in connection with the feeding of the seeds, for a special seed hook and mounting plate of dish-like formation, which I find gives a very uniform feed, because of the action of the seeds themselves when operated upon by the parts of my feed.

I also provide for deep and shallow planting with alternate seed dropping.

In connection with the seed feeding devices I provide for a clutch mechanism for the seed hook carriers individually, so that when it is desired to stop the feed from any hopper, the feeding mechanism itself stops entirely, and no moving parts are exposed to the seeds, such that they are milled around in the feed chamber or hopper bases.

In general I have arranged the parts of my machine so that they are strong, simple and easy to manufacture and assemble, and in connection with my hoppers I have provided for a plate of special shape for direction of seeds of various kinds to the feed chamber.

These objects and other advantages to be noted I accomplish by that certain construction and arrangement of parts to be hereinafter more specifically pointed out and claimed.

In the drawings,

Figure 7 is a section on the line 7—7 of Figure 2.

Figure 8 is a plan view of the adjustable hopper plate showing it in peanut feeding position.

Figure 9 is a like view showing the plate in corn or bean feeding position.

Figure 10 is an elevation taken from the right hand side of Figure 8.

Figure 11 is a rear elevation showing the parts at their proper angles with relation to the frame, and showing the spout.

Figure 12 is a detail elevation taken vertically of the machine showing the spout.

Figure 13 is a perspective view of the entire machine.

Figure 14 is a detail of the parts of the spout disassembled.

Figure 1:
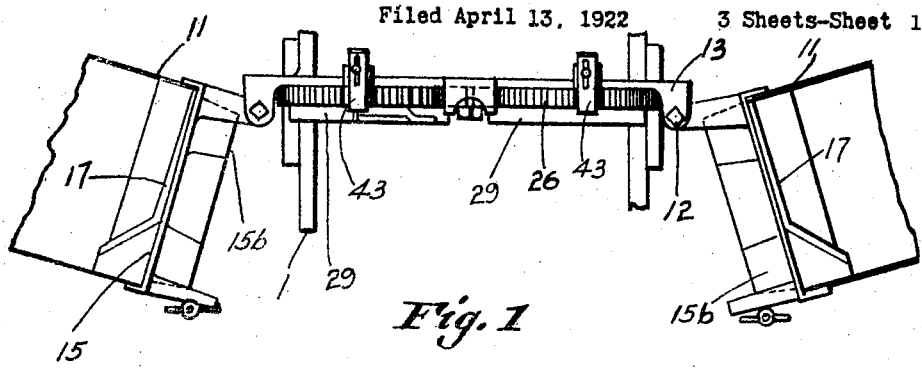
Figure 1 is an edgewise elevation of the seed feeding parts showing the hoppers swung back (the gears are at a forty-five degree angle to the frame).

It will be understood that the plan of my machine generally is to have a frame supported by a wheel, which also acts as a cover wheel and to have one or more hoppers having bases inclined at an angle, such as forty-five degrees. I then propose to set the seed feeding devices below the hopper and to carry the seeds by means of a seed ring upwardly and rearwardly, where they drop through a hole into the spout.

I drive the moving parts from the carrying and covering wheel, and by a damper-like structure in the spout may direct my seeds close to the furrow depth shoes or away from them to obtain planting at various depths.

I have shown the frame of the machine at 1, the carrying and covering wheel at 2, the furrow opener at 3, and the guiding handles at 4. The face of the carrying wheel is formed with a series of concentric rows of gear teeth 2a, and carried by the frame is a shaft 5 on which is an adjustable pinion 6 for engaging with the desired row of said teeth. On the other end of the shaft, which is squared for the purpose, is a sliding pinion 7 having a clutch groove 8, in which operates the clutch fork 9. A handle 10 is provided for the clutch fork, which is convenient to the operator at the guiding handles of the machine.

The hoppers 11 are hinged on bolts 12 on a slanting base plate 13. This base plate is mounted on the main frame of the machine and the feed devices lie on it and have their angle controlled by its position. The hoppers swing laterally on their hinges to give full access to the feeding mechanism, and swing bolts on the hoppers serve to clamp them down between notches 14 on the base plate.

Referring first to the specific hopper construction, it will be noted that the bases 15 are formed entirely closed except for an oval-shaped delivery hole 15a, and depending from the bases are annular flanges 15b, which rest upon the seed rings when the hoppers are closed and incidentally hold down the seed feeding parts.

These flanges form, as will be noted, a chamber between the bases of the hoppers and the seed feeding parts, which is known as the seed feeding chamber.

Set into the inside of the hoppers and held adjustably against the bases by bolts 16 are seed delivery plates 17. These plates are formed with one side turned up to form a sloping shoulder or ridge 18 that terminates in an orifice 19 of the same size, or approximately so, of the oval delivery hole in the bases of the hoppers. The registry of the orifice 19 with the oval hole will provide the outlet for peanuts, the slope to the ridge preventing the nuts from resting on the ledge 21, to be described necessary for the special small seed orifices.

The ridge on the plate tapers off to the level of the plate 17 at 20 to form an overhanging lip, and extending down from the ledge 21, which is a flat portion at the top of the ridge near its periphery, is a chute 22, which is directed under the overhanging lip and leaves a restricted orifice 23 between its end and the body of the plate. The element 22 acts as a chute in connection with the bottom of the hopper.

This orifice is for small seeds, such as beans, corn, peas and the like. In addition to restricting the size of the outlet, the overhanging lip prevents seeds from getting to the orifice without traveling down the chute, and the chute restricts the flow of seeds so as to prevent a flooding of seeds into the seed chamber when the said orifice is brought into registry with the hole in the hopper base. It does this because the angle of the chute obstructs the flow of seeds along the bottom of a hopper directly through the orifice.

As indicated, the hoppers are formed square, and riveted into the sides of each hopper is a curved plate 24, which forms the bottom of the hopper when it is closed down on the machine. This rounded formation provides a close bearing for the adjustable plates 17 and directs the seeds to the orifices in the plate, since the hopper position brings the plate 24 to a small slant.

Referring next to the seed feeding mechanism, it will be noted that formed on the base plate 13 of the machine are disk-shaped raised portions 25 forming annular shoulders on the base plate.

The ring gears 26 seat over these extensions 25 engaging around the shoulders formed thereby. Either integral with the base plate or (as shown) formed of a separate member for each feeding device is a dished plate 27 of circular shape, the periphery of which is of less diameter than the shoulder formed by the extension 25. When set in place by means of bolts 28 in the center of the said extensions, the edges of the dished plates provide another shoulder over which are set the seed rings 29.

The rings 29 have seed hooks 30 arranged with the desired spacing and of the desired conformation. In the showing in the drawings, the hooks are in the form of curved teeth, so shaped as to form pockets for individual seeds with the tops of the teeth overhanging the pockets.

The ring gears have their teeth 31 cut in an annular rib 32, which extends above the level of the bottom of the dished plate, said rib providing an annular shoulder spaced away from the shoulder formed by the dished plate.

It is between these two annular shoulders or ribs, that the seed rings engage. Each ring, in the preferred form, has a flange 33 that overlies the periphery of the dished plates and an expanded base which overlies the ring gear (Figure 7). The flange on the hopper when closed rests on the top of the seed ring, so that the formation of the ring, as above described, holds the gear in place when the machine is in use. The seed hooks extend down over the rim of the dished plates.

The one ring gear engages with the pinion 7, while an idler pinion 34 connects the two ring gears together.

The seed rings are formed with lugs 35 on their outer peripheries, which are engaged to drive the rings around by means of clutch fingers 36 on the ring gears. The fingers are pivoted at 37 to the gears and have tails 38 and rounded noses 39.

Set into the under faces of the fingers are plungers 40 sliding in sockets in the fingers, which house small springs 41, which tend to thrust the plungers out of the sockets. The ring gears are formed with a shallow socket 42 in the outer rib, which is located in the base of a slanting groove 42$^a$ extending inwardly of the rib. The plungers spring into the hole and can be forced out due to their rounded shape, whereupon they will slide down the groove 42$^a$, forcing the fingers against the seed rings and permitting some oscillation during the feeding operation. This mechanism is to secure the fingers against dislodgement from position of clutching or releasing the seed rings.

To operate the fingers I provide as a preferred structure a sliding plate 43 held on a bracket 44 that is screwed to the base 13, the slide being formed by a slot and screw in any desired way. When the plates are thrust downwardly, the lips 45 thereon contact with the rounded noses on the clutch fingers and thrust the noses into a position of engagement with the seed ring lugs. When the plates are thrust upwardly, the lips strike the tails of the fingers which are bent away from the body of the fingers, as indicated at 38, and thus move the fingers to releasing position.

As a result of the structure above described, the seeds are fed to the feed spout. The raised portions 25 of the base 13 have holes 47 at their upper ends, from which seeds drop into the spout, and the seeds fall into the feed chambers from the hoppers. As the seed plates revolve, the hooks each select out a seed and carry it to the hole 47.

Figure 2:
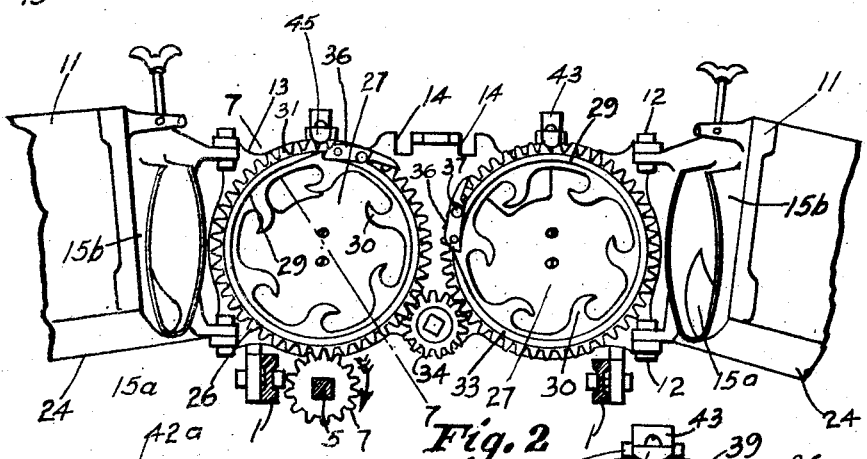
Figure 2 is a plan view of the parts shown in Figure 1 with the parts swung around through an angle of forty-five degrees to bring them to the position shown.
Figure 3:
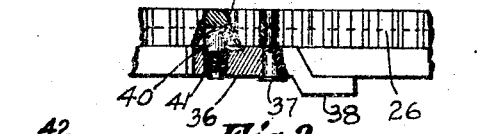
Figure 3 is a detail broken-away-elevation showing the ring gear and clutch operating finger.
Figures 4, 6:
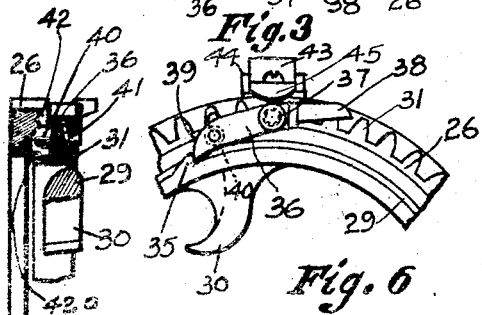
Figure 4 is a detail section taken radially through a ring gear, showing the same parts as Figure 3.
Figure 6 is a like view showing the finger in clutched position ready to be struck out by the operating device.
Figure 5:
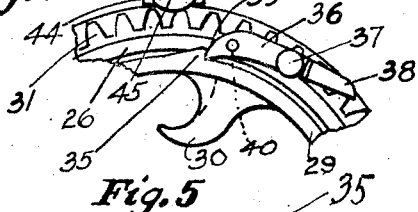
Figure 5 is a detail plan view showing a clutch finger in operating position to drive the seed ring from the ring gear.
Figure 15:
Figure 15 is a bottom plan view of the seed ring.

By arranging the gears so that the clutch fingers thereon are not in a similar position for the two gears, but instead, so that one is properly advanced ahead of the other (Figure 2), it will be observed that the two seed ring lugs will be at different positions when both rings are being revolved. These two positions for alternate planting should be arranged so that seeds will be alternately delivered to the holes in the base 13 and thus to the spout.

When the gears are once arranged, then the stopping of any one seed ring by operating the clutch finger will not throw the parts out of alternate feeding relation, since the hopper resting on the seed ring will hold it frictionally against movement once it is released, and to pick it up again the clutch finger is tripped back again, resuming the alternate feed as before.

To change the gear positions, the hoppers are thrown back and the seed rings lifted out, whereupon the gear may be lifted out and set back into place with the clutch fingers in a similar position. This will give simultaneous feeding, or, if desired, the intermediate gear may be removed and the gears 26 revolved by hand, after which the intermediate gear is replaced. This will be done where some means is provided for holding the ring gears in place, as for example, by washers set under the dished plates and lapping the inside of the ring gears.

The use of the dished-shaped plate in connection with pocket-forming hooks is quite important. The curved sloping wall of the dished plate is, of course, stationary. The hooks on the ring come down over this sloping portion, so that the outer portion of the teeth and the overhanging portions form a pocket, with the curve of the dished plate completing the pocket.

As the hooks gather a body of seed and start forcing them upwardly, all but a few seeds will fall off as soon as the hooks pass the level of the center of the feeding mechanism. The friction of the curved wall will tend to twist one of the retained seeds around to a long ways position in the pocket, which will eject the remainder of the seeds, so that they, too, will fall away before the hook in question reaches the hole to the spout.

To take apart this seed feeding mechanism and put it together again requires a mere swinging of the hoppers and lifting of the parts away, and while one of the hoppers is not feeding, the seeds held in the feed chamber are not subjected to any milling action at all, since no parts will be in movement, and I avoid the necessity of any hole closing flaps.

Referring to the feed spout 50, it will be noted that it is expanded funnel-wise to take seeds as they are dropped from either feeding mechanism. The tubular portion 51 of the spout is formed with two passageways, one leading from each half of the funnel-like portion.

The bottom of the tubular portion is expanded to form two delivery openings, one in front of the other, the front one lying just behind the furrow opener. Referring to Figure 14, it will be noted that the tube containing portion of the spout is made of two parts or halves, which are bolted together. The tube 52 for its lower portions is arranged in each half, while its upper end 52$^a$ is in the one-half only. So also the tube 53 for its lower portions is formed in both sections, while the upper portion 53ᵃ is in one of the halves only. The web 53ᵇ cuts off the mouth 53ᵃ from the mouth 52ᵃ, where the seeds come in from the funnel portion. A fertilizer opening 51ᵃ may be arranged in both sections.

Set into the funnel portion is a swinging plate 54 mounted on a pin 55, which pin is located centrally of the funnel mouth and is controlled by an external handle 56. The plate is the width of the funnel (same being rectangular in cross section), and when arranged to extend vertically through the funnel acts to send seeds from one of the feed devices into the tube 52, and from the other into the tube 53. When the plate 54 is swung to touch the left hand side of the funnel, all the seeds will be delivered to the right hand tube 52 and vice versa when swung to touch the right hand side.

Since the opening from the tube 52 is to the rear of the opening from the tube 53, the seeds dropped from it will not be set so deeply into the ground, because the earth opened by the furrow opener will have begun to curl back into the furrow.

Thus in addition to an alternate seeding arrangement which requires but one adjustment in spite of frequent startings and stoppings, I provide for different depths of planting from one hopper than from the other. I may plant two kinds of seeds together or alternately at either depth, or alternately or together at different depths.

As the general mode of operation of machines of this character are well known, it will not be necessary to append a complete description of the manner of use of one of the machines.

I have not attempted in the above description to point out the possibility of substitution of mechanical equivalents in the present art for the parts described, but I desire to include such equivalents as within the scope of my invention.

Having thus described my invention, what I claim as new and desire to secure by Letters Patent, is:—

1. In a seed planting device, the combination with a hopper for supplying seed, a base for said hopper having a hole therein, and an adjustable member in said hopper and adapted to form a chute from the hopper terminating in an aperture to register with the orifice, and also adapted to form a larger hole registering with said orifice.

2. In a seed planting device, the combination with means for supplying seed, of a seed ring for feeding seeds to a delivery point, a plate over which said seed ring seats, said plate having a circular upwardly curved portion, and hooks on the ring overlying said portion, and forming two sides of a pocket of which the curved portion of the plate forms a third.

3. In combination, in a machine of the character described, a plurality of seed supplying means, seed feeding means adapted to deliver seeds intermittently, one of such means for each supply, means for driving said feeding means, adapted to operate said means to deliver seeds alternately, and means for stopping either feeding means and starting it up again without interfering with the alternate delivery.

4. In a machine of the character described, the combination with a seed hopper, of means for feeding seeds from the base of the hopper, comprising a fixed plate, a seed ring revolving on said plate, and means for driving the seed ring from its outer periphery, said outer periphery being out of contact with any seeds, and means for clutching and unclutching the ring from its driving mechanism.

5. In a machine of the character described, a circular seed pocket carrying member, seed pocket means on said member, and a ring gear surrounding said carrying member, and a clutch mechanism between the gear and the member.

6. In a machine of the character described, a circular seed pocket carrying member, seed pocket means on said member, and a ring gear surrounding said carrying member, a lug on said carrying member, and a clutch finger on the gear adapted to move to position of engagement or disengagement with the lug.

7. In a machine of the character described, a circular seed pocket carrying member, seed pockets on said member, and a ring gear surrounding said carrying member, a lug on said carrying member, and a clutch finger on the gear adapted to move to position of engagement or disengagement with the lug, said finger having resilient means for maintaining it in lug engaging position against the carrying member periphery.

8. In a seed planting device, a hopper having an opening in the one end of constricted size, and a curved bottom terminating at said opening, and a circular plate in the end, adapted to conform to the curved bottom and having different sized openings therein to register with the opening in the said end.

9. In a seed planting device, a hopper having an opening in the end for delivery of seeds, and a plate mounted in said end, said plate having a wide opening to register with the opening in the end of the hopper, with a curved arched wall extending up from the body of the plate along said opening to prevent bridging or lodging of seeds to block said opening.

10. In a seed planting device, a hopper having an opening in the end for delivery of seeds, and a plate mounted in said end, said plate having a raised portion, a chute extending from the raised portion, an opening in the plate at the end of the chute for registry with the opening in the hopper end, and a raised portion on the plate overhanging the opening in the plate but leaving open the mouth of said chute.

11. In a seed planting device, a hopper having an opening in the end for delivery of seeds, and a plate mounted in said end, said plate having a raised portion, a chute extending from the raised portion, an opening in the plate at the end of the chute for registry with the opening in the hopper end, and a raised portion on the plate overhanging the opening in the plate but leaving open the mouth of said chute, said raised portions having curving walls to prevent lodging of seeds.

12. In a seed planting device, a hopper having an opening in the end for delivery of seeds, and a plate mounted in said end, said plate having a wide opening and a small opening, both adapted upon adjustment of the plate to register with the opening in the hopper end, a raised arched wall on the plate, said wall extending along the wide opening, formed with a chute extending to the small opening, and arranged to overhang the chute to prevent direct access of seeds to the small opening without passing down the chute, said chute extending across the path of the seeds to the orifice along the bottom of the hopper.

13. In a seed planting device, the combination with means for supplying seed, of a seed ring for feeding seeds to a delivery point, a plate over which said seed ring seats, said plate having a circular upwardly curved portion, and hooks on the ring overlying said portion, and forming two sides of a pocket of which the curved portion of the plate forms a third, said seed supplying means comprising a hopper having a delivery opening, and a flange surrounding said opening, and adapted when the hopper is closed to form a seed chamber between the hopper base and the plate.

14. In a seed planting device, the combination of a hopper, a dished plate, a ring engaging over the rim of said plate, an aperture in the plate and in the hopper, said ring having means thereon for lifting and delivering seeds from the plate to the aperture therein, and a flange on the hopper to engage over said ring and form a seed compartment between it and the base.

15. In a seed planting device, the combination of a dished plate, a ring engaging over the rim of said plate and having seed pockets thereon, and a ring gear mounted outside of said plate, said ring lying on the gear, and the gear adapted to drive the ring, and a hopper adapted to come down into abutment with the ring, thereby holding said ring and gear in place.

16. In a seed planting device, the combination of a dished plate, a ring engaging over the rim of said plate and having seed pockets thereon, and a ring gear mounted outside of said plate, said ring lying on the gear, and the gear adapted to drive the ring, and a hopper having an aperture, and a flange surrounding said aperture, said flange being adapted to come down over the ring, thereby holding the ring and gear in place and forming a seed compartment between the hopper and the plate.

17. In combination, in a seed planter, a base, having a raised portion thereon, a ring gear mounted loosely over said raised portion, a seed pocket means mounted loosely inside of the gear and clutch means intermediate the periphery of the seed pocket means and the gear, and a hopper for seeds, adapted to come down over the seed pocket means interiorly of the gear to exclude the seeds from contact with the gear, whereby the gear may revolve when unclutched from the seed pocket means without milling the seeds.

18. In a machine of the character described, a circular seed pocket carrying member, seed pocket means on said member, and a ring gear surrounding said carrying member, and a clutch mechanism between the gear and the member, a hopper, and means on the hopper for excluding seeds from access to the gear and delivering them to the seed pocket carrying member.

19. In a seed planting device, the combination with means for supplying seeds, of a ring having inwardly extending hooks formed in a curve, with the interior of the hooks concaved, and an inwardly curved, fixed annular wall, concentric with the ring, and over which the hooks lie, for the purpose described.

20. In a seed planting device, the combination with means for supplying seeds, of a base plate having an upwardly curved annular wall, an aperture in said plate, and a rotating ring mounted over said wall, and having hooks extending inwardly over said wall, said hooks formed in a curve, and having their walls substantially against the plate and concaved from their crests to the plate, to form seed pockets for conveying individual seeds to the aperture in the plate.

21. In a seed planting device, the combination of means for supplying seeds, a base plate having an annular wall, a ring mounted over said wall and having hooks extending inwardly over said wall, said hooks being curved to form pockets together with the wall, whereby upon revolution of the ring, the wall will act to turn seeds to a position endwise in the pockets, for the purpose described.

22. In a machine of the character described, a plurality of seed pocket means, ring gears surrounding said means, and adapted to be driven from a source of power, a clutch device located at fixed points on the gears, means on the seed pocket means to engage said clutch devices, said means being also fixed, and means to operate said clutch devices.

23. In a machine of the character described, a plurality of seed pocket means, ring gears surrounding said means, clutch fingers located at fixed points on the ring gears, lugs on the seed pocket means to be engaged by the fingers, said clutch fingers being movable to clutching and unclutching position.

24. In a machine of the character described, a plurality of seed pocket means, ring gears surrounding said means, clutch fingers located at fixed points on the ring gears, lugs on the seed pocket means to be engaged by the fingers, said clutch fingers being movable to clutching and unclutching position, and means on the machine adapted to be moved to position to contact with the fingers as they rotate with the gears to move the said fingers.

25. In a machine of the character described, a plurality of seed pocket means, ring gears surrounding said means, clutch fingers located at fixed points on the ring gears, lugs on the seed pocket means to be engaged by the fingers, said clutch fingers being movable to clutching and unclutching position, and means on the machine adapted to be moved to positions of contact with the fingers at different points thereon, as said fingers rotate with the gears, said fingers adapted so that one point of contact moves them to clutching position and the other moves them out of clutching position.

26. In a machine of the character described, a plurality of seed pocket means, ring gears surrounding said means, clutch fingers located at fixed points on the ring gears, lugs on the seed pocket means to be engaged by the fingers, said clutch fingers being movable to clutching and unclutching position, and means for resiliently retaining the fingers in both clutched and unclutched positions.

27. In a machine of the character described, a circular seed pocket carrying member, seed pocket means on said member, and a ring gear surrounding said carrying member, a lug on said carrying member, and a clutch finger on the gear adapted to move to position of engagement or disengagement with the lug, and means for resiliently retaining the finger in either position.

28. In a machine of the character described, a circular seed pocket carrying member, seed pocket means on said member, and a ring gear surrounding said carrying member, a lug on said carrying member, and a clutch finger on the gear adapted to move to position of engagement or disengagement with the lug, and means for resiliently retaining the finger out of engagement, and for resiliently pressing the finger into abutment with the periphery of the seed pocket carrying member.

29. In a seed planter, a plurality of seed supply means, a plurality of seed selecting means, gears for driving the selecting means, a source of power, means for coupling and uncoupling the source of power from the gears to drive both gears, and means for coupling and uncoupling each gear from its seed selecting means.

30. In combination, in a machine of the character described, a plurality of seed supplying means, seed feeding means adapted to deliver seeds intermittently, one of such means for each supply, means for driving said feeding means, adapted to operate said means to deliver seeds alternately, and means for stopping either feeding means and starting it up again without interfering with the alternate delivery, and a source of power, and means comprising a clutch from the source of power for driving the driving means.

31. In a machine of the character described, a circular seed pocket means, a ring gear surrounding said means, a clutch finger pivotally mounted on the gear, an abutment on the periphery of the pocket means for contact with the finger, a spring plunger in the finger, a socket in the gear to engage the plunger, and a tapered groove running at a slant from the socket toward the center of the gears, said groove being adapted to cooperate with the plunger in forcing the finger resiliently against the periphery of the pocket means.

32. In a machine of the character described, a circular seed pocket carrying member, seed pocket means on said member, and a ring gear surrounding said carrying member, and a clutch mechanism between the gear and the member, and means for resiliently holding the clutch mechanism in engaging position with the circular member, whereby it may have some movement without coming out of engagement.

OSCAR H. LUEBBING.